(12) United States Patent
Venugopal et al.

(10) Patent No.: US 8,190,555 B2
(45) Date of Patent: May 29, 2012

(54) METHOD AND SYSTEM FOR COLLECTING AND DISTRIBUTING USER-CREATED CONTENT WITHIN A DATA-WAREHOUSE-BASED COMPUTATIONAL SYSTEM

(75) Inventors: K S Venugopal, Karnataka (IN); Pulikottil Joseph Anish, Karnataka (IN); Badrinath Ramamurthy, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 271 days.

(21) Appl. No.: 12/322,263

(22) Filed: Jan. 30, 2009

(65) Prior Publication Data

US 2010/0198778 A1    Aug. 5, 2010

(51) Int. Cl.
*G06F 7/00* (2006.01)
*G06F 17/00* (2006.01)

(52) U.S. Cl. ...................................................... 707/602

(58) Field of Classification Search .................. 707/705, 707/736, 602
See application file for complete search history.

(56) References Cited

U.S. PATENT DOCUMENTS 7,139,779 B1 * 11/2006 Kornelson et al. .................... 1/1
7,630,956 B2 * 12/2009 Wyatt et al. .......................... 1/1

OTHER PUBLICATIONS

W3C—www.w3.org, OWL Web Ontology Language Overview—W3C Recommendation Feb. 10, 2004 (18 pages).
W3C—www.w3.org, Resource Description Framework (RDF): Concepts and Abstract Syntax—W3C Recommendation Feb. 10, 2004 (20 pages).
W3C—www.w3.org, SPARQL Query Language for RDF—W3C Recommendation Jan. 15, 2008 (103 pages).

* cited by examiner

*Primary Examiner* — Greta Robinson
*Assistant Examiner* — Jeffrey Chang

(57) ABSTRACT

Embodiments of the present invention are directed to data-warehouse-based computational systems that provide for collection and distribution of user-created content among users of the data-warehouse-based computational systems. User-created content is initially stored in a semantic-model-based data-storage facility, for efficient and rapid access to other users, and migrates to storage according to a dimensional model within the data warehouse. The combination of a semantic-model-based data-storage facility and dimensional-model-based data-storage facility within the data warehouse provides both fast access to, and rapid update of, user-created content as well as incorporation of user-created content into the data warehouse for long-term storage and access.

21 Claims, 21 Drawing Sheets

| CUSTOMER INFORMATION | DATE INFORMATION | ITEM INFORMATION | PRICE INFORMATION |
|---|---|---|---|
| | | | |
| | | | |
| | | | |
| | | | |
| | | | |
| | | | |
| | | | |
| | | | |
| | | | |
| | | | |
| | | | |
| | | | |
| | | | |

Figure 1C

```xml
<rdf:RDF
        xml:base="http://www.hp.com/stsd/infinite/semannt/ns#"
        xmlns="http://www.hp.com/stsd/infinite/semannt/ns#"
        xmlns:rdf="http://www.w3.org/1999/02/22-rdf-syntax-ns#"
        xmlns:xsd="http://www.w3.org/2001/XMLSchema#"
        xmlns:fact="http://www.hp.com/stsd/infinite/fact/"
        xmlns:dim="http://www.hp.com/stds/infinite/dimension/"
        >
<fact:GMFactTable
rdf:about="Year%3D2007%3A%3AQuarter%3DQ3%3A%3AMonth%3DJul%3A%
3AGM%25251190776883265-user1">
<dim:UserCreatedData rdf:parseType="Resource">
    <dim:uccMetaStatus>A</dim:uccMetaStatus>
    <dim:uccMetaTime>1190776883265</dim:uccMetaTime>
    <dim:uccData>General Hike in Asiapacific
    </dim:uccData>
</dim:UserCreatedData>
<dim:Date rdf:parseType="Resource">
    <dim:Year>2007</dim:Year>
    <dim:Quarter>Q3</dim:Quarter>
    <dim:Month>Jul</dim:Month>
</dim:Date>
<dim:Geography rdf:parseType="Resource">
    <dim:Region>Asiapacific</dim:Region>
    <dim:Country>India</dim:Country>
</dim:Geography>
<dim:Product rdf:parseType="Resource">
    <dim:ProductLine>Servers</dim:ProductLine>
    <dim:Family>ISS</dim:Family>
    <dim:Series>DLX</dim:Series>
</dim:Product>
        <fact:USER>anish@hp.com</fact:USER>
        <fact:GM>13</fact:GM>
        <fact:TIME>1020</fact:TIME>
</fact:GMFactTable>
</rdf:RDF>
```

Figure 9

```
PREFIX infinite:    <http://www.hp.com/stsd/infinite/semannt/ns#>
PREFIX fact:        <http://www.hp.com/stsd/infinite/fact/>
PREFIX dim:         <http://www.hp.com/stsd/infinite/dimension/> select ?factId ?comment ?user ?timeValue ?fstatus ?ftime where {
?factID   fact:USER                ?user .
?factID   fact:TIME                ?timeValue .
?factID   fact:UserCreatedData     _:b .
_:b  dim:uccMetaStatus  ?fstatus .
_:b  dim:uccfactMetaTime ?ftime .
_:b  dim:uccData         ?comment .
?factID  dim:Date       _:b1
_:b1 dim:Year "2007" .
_:b1 dim:Quarter "Q3".
_:b1 dim:Month "Jul".
?factId  rdf:type  dim:GMFactTable
```

Figure 10

METHOD AND SYSTEM FOR COLLECTING AND DISTRIBUTING USER-CREATED CONTENT WITHIN A DATA-WAREHOUSE-BASED COMPUTATIONAL SYSTEM

TECHNICAL FIELD

The present invention is related to data warehousing, business-intelligence systems, interactive, distributed systems, and, in particular, to a method and system for collecting and distributing, in real time or near real time, user-created content within the context of a data-warehouse-based computational system.

BACKGROUND OF THE INVENTION

The rapid development of data-processing systems, electronic communications, and data storage-and-retrieval systems have provided the foundation for an equally rapid evolution of data-driven computational systems. Although data-driven computational systems, data-management systems, and components of data-management systems have been traditionally classified as belonging to one of various categories, including data-warehouse systems, on-line-transaction-processing ("OLTP") systems, and other such categories, modern data-driven computational systems span a continuum that includes these traditional categories as well as hybrid systems that incorporate features of two or more of the categories. For example, traditional OLTP systems are designed for rapid insertion and update of relatively small and well-constrained portions of the data stored in a database and traditional data-warehouse systems are designed for rapid retrieval of relatively large amounts of data from enormous databases, both types of systems may be implemented using the same commercial relational database-management systems that provide functionalities and capabilities for both types of operations. Moreover, many data-driven, distributed systems provide functionalities that span the functionalities provided by these two different types of traditional data-driven systems. Recently, the rapid evolution and commercial acceptance of electronic communications, the Internet, and new, Internet-based technologies have provided a variety of new capabilities available to, and have introduced new problems associated with, data-driven system implementation.

While the distinctions that characterize and define traditional categories of data-driven systems have become blurred, in currently available data-driven systems, there remains a class of data-driven systems that can be characterized as data-warehouse-based systems because these systems need to periodically harvest and process massive amounts of information for incorporation in data warehouses for subsequent access by users, generally via various application programs. Examples of such data-warehouse-based systems include various types of business-intelligence systems, in which large amounts of data are continuously collected, compiled, and stored into large databases, from which the compiled data is accessed by various business and analysis applications to provide a variety of high-end data analysis and interpretation to business-intelligence-application users. Specific business-intelligence applications include applications that provide analysis of business trends, market performance, market-trend analysis, market prediction, inventory-and-process monitoring, analysis, and reporting, and other such valuable tools for monitoring, analyzing, and predicting various aspects of businesses, markets, research groups, universities, and other organizations.

A recent trend in large, distributed computing systems is to provide functionality for real-time communications and interaction among the users of distributed computer systems. Modern computer users are accustomed to, and have grown increasingly reliant on, rapid, real-time exchange of information with tens to hundreds or thousands of remote users via email, social-network sites, message boards, Internet forums, chat rooms, blogs, real-time document and graphics annotation, and other such information-exchange forums. Unfortunately, real-time information exchange is, in many ways, contrary to the general approach to data collection and distribution represented by traditional data-warehouse-based systems, in which information is made available to users of such systems only after extensive and time-consuming harvesting and processing, over time scales that exceed those needed for real-time or near-real-time information exchange. As a result, researchers, users of various distributed systems and data-driven computational systems, and manufacturers and vendors of computer hardware and software recognize the importance of continuing to develop approaches for incorporating real-time and near-real-time information exchange in data-warehouse-based distributed systems.

BRIEF DESCRIPTION OF THE DRAWINGS

FIGS. 1A-G illustrate characteristics of a data-warehouse-based system, such as a distributed business-intelligence system.

FIG. 9 shows an RDF/XML expression for the RDF subgraph shown in FIG. 8.

FIG. 10 provides an exemplary SPARQL query that can be executed against an exemplary user-created-content semantic-model-based data-storage facility in order to extract the user-created content associated with a GM table and with a particular month from the semantic-model-based data-storage facility.

DETAILED DESCRIPTION OF THE INVENTION

Embodiments of the present invention are directed to collecting, storing, retrieving, and distributing user-created content ("UCC") within distributed, data-warehouse-based computational systems, including business-intelligence systems.

The data-warehouse-based systems generally harvest large amounts of data from a variety of different sources, compile the data, and store the data in large data-storage facilities. The stored data can then be retrieved and processed by various types of application programs in order to provide information to users of the applications, including business-intelligence applications, to allow users to monitor, analyze, and predict various characteristics and conditions related to commercial enterprises, markets, operational processes, and other such entities and enterprises. Computer-system users have come to increasingly rely on real-time and near-real-time computer-based communications with other computer-system users, and users of data-warehouse-based computational systems now expect to be able to provide comments, feedback, analysis, and other UCC to other users of business-intelligence applications on a real-time or near-real-time basis within the context of the data-warehouse-based systems and applications that retrieve data from them. Unfortunately, real-time or near-real-time collection, storage, retrieval, and distribution of UCC represents a significant departure from the traditional periodic, time-consuming data-harvesting and data-compilation operations by which data is added to data-warehouse-based systems. In order to provide the real-time or near-real-time collection, storage, retrieval, and distribution of UCC within the context of data-warehouse-based systems, including business-intelligence systems, embodiments of the present invention supplement the traditional dimensional-model-based data-storage facilities of data-warehouse-based systems with a semantic-model-based data-storage facility, and provide for query-based access to the semantic-model-based data-storage facility as well as for migration of data from the semantic-model-based data-storage facility to the dimensional-model-based data-storage facility.

Figure 1A:
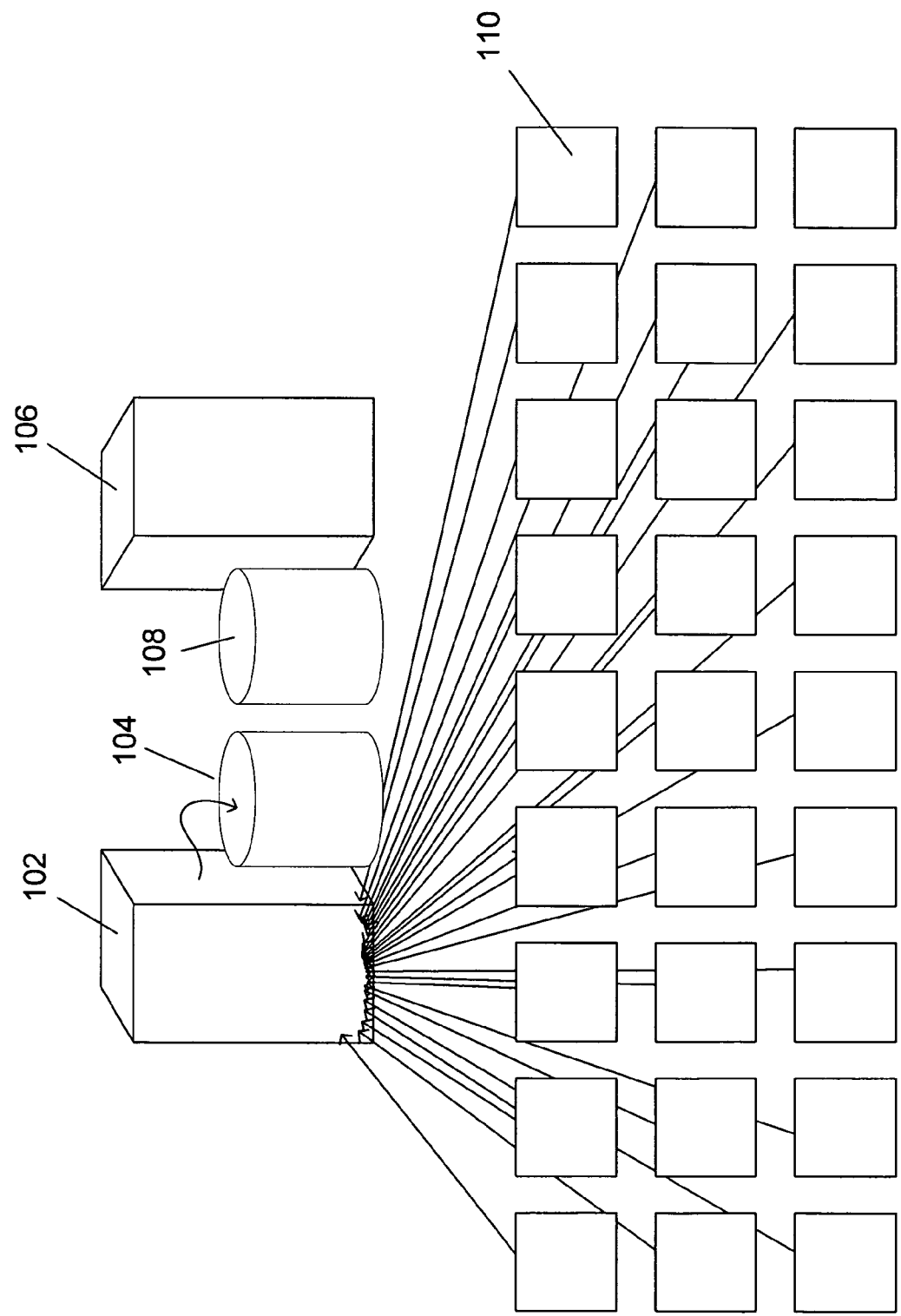
Figure 1B:
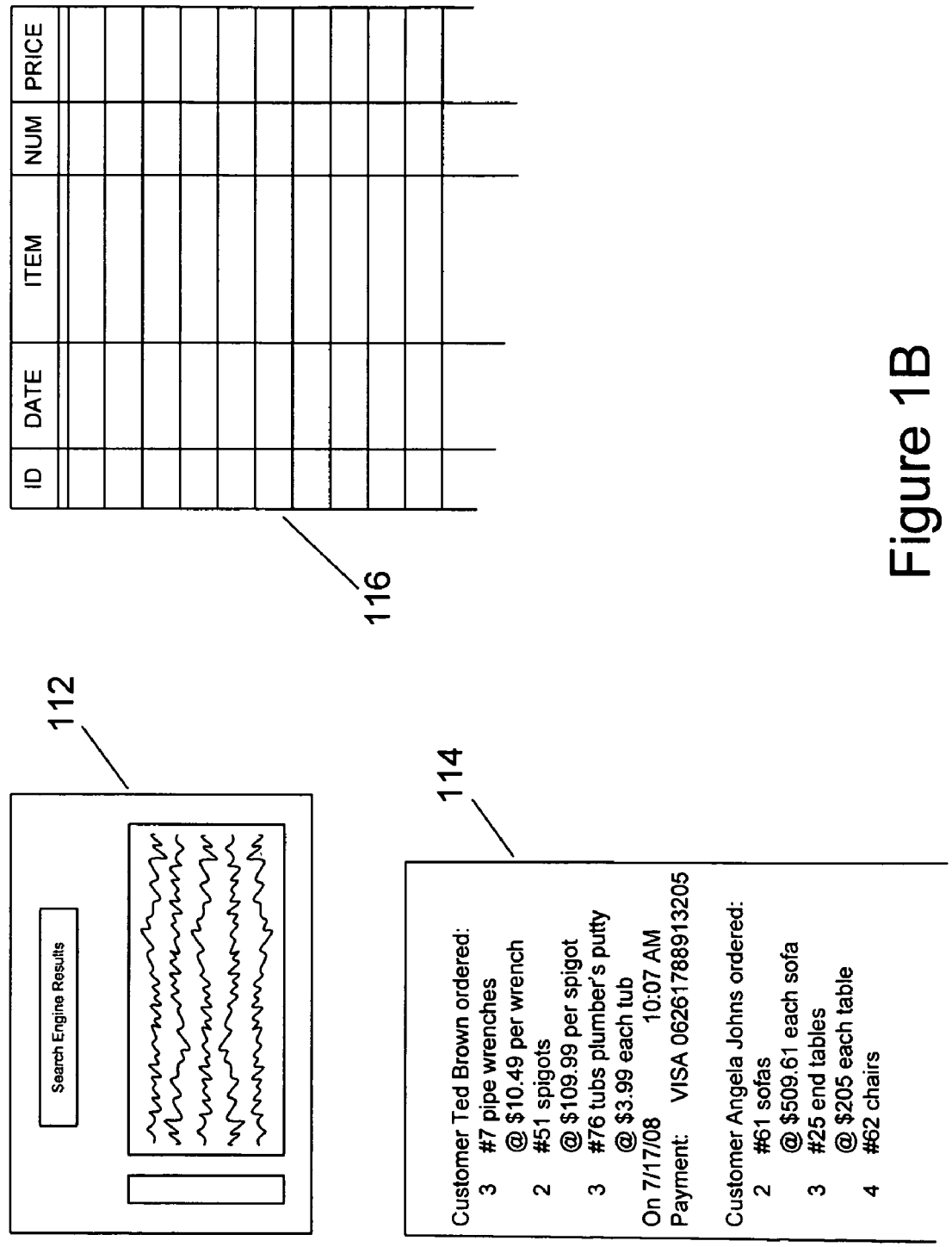

FIGS. 1A-G illustrate characteristics of a data-warehouse-based system, such as a distributed business-intelligence system. The data warehouse is shown, in FIG. 1A, as implemented on a first mainframe computer 102 with attached data storage 104 and a second mainframe computer 106 with attached data storage 108. A data warehouse may be implemented on any of a large number of different hardware and software platforms, including various types of distributed systems, which include mainframe computers, servers, work stations, personal computers, and other types of computers interconnected by high-speed electronic communications media and accessing internal and external mass-storage components, including high-end redundant-array-of-independent-disks ("RAID") mass-storage systems. As shown in FIG. 1A, the data warehouse collects information from a large number of information sources, each represented, in FIG. 1A, by a square, such as square 110. Information sources may be various types of computer systems, including personal computers and work stations, and may also include higher-end distributed computing systems, various types of business machines and data-processing systems, the Internet via web crawlers and other applications, and other such information sources. More importantly, as shown in FIG. 1B, the types of information that may be accessed by the data warehouse may vary from web pages encoded in HTML 112, data stored in flat files 114 or various types of indexed files, data stored in relational-database-management-system tables 116, and from other types of data-storage facilities.

In general, the data warehouse accesses and processes information in order to retrieve certain types of information. For example, in FIG. 1B, the various types of information, including web pages, flat files, index files, and RDBMS tables, are shown to contain customer purchase information. The data warehouse for a particular retail business, for example, may access and process purchase-transaction-related data, inventory data, supplier information, and other such data. In general, related types of information may be accessed from a variety of different information sources, and the accessed information may be encoded and formatted in many different ways. An initial step, in data harvesting, is to analyze data initially accessed from various information sources to determine whether the data matches certain patterns, and therefore has a high likelihood of being relevant data for extraction and processing. In general, a data warehouse will employ a variety of different patterns or templates in order to identify relevant data related to a variety of different concepts or entities.

Another step in data harvesting is transformation of the various types of relevant data obtained from information sources, encoded by various different encodings and formatted in various different formats, into compiled or transformed data that is commonly encoded and stored according to a common format. For example, FIG. 1C shows an RDBMS table with columns corresponding to customer information, date information, item information, and price information, in which each row represents a particular retail transaction. Transformation of retail-transaction-related information produces row instances of this table. While the columns are typed, an initially relatively unconstrained typing may be chosen, to facilitate initial transformation. For example, numerical data may be stored in character strings, rather than initially converted from character strings to integer or floating-point values.

Figure 1D:
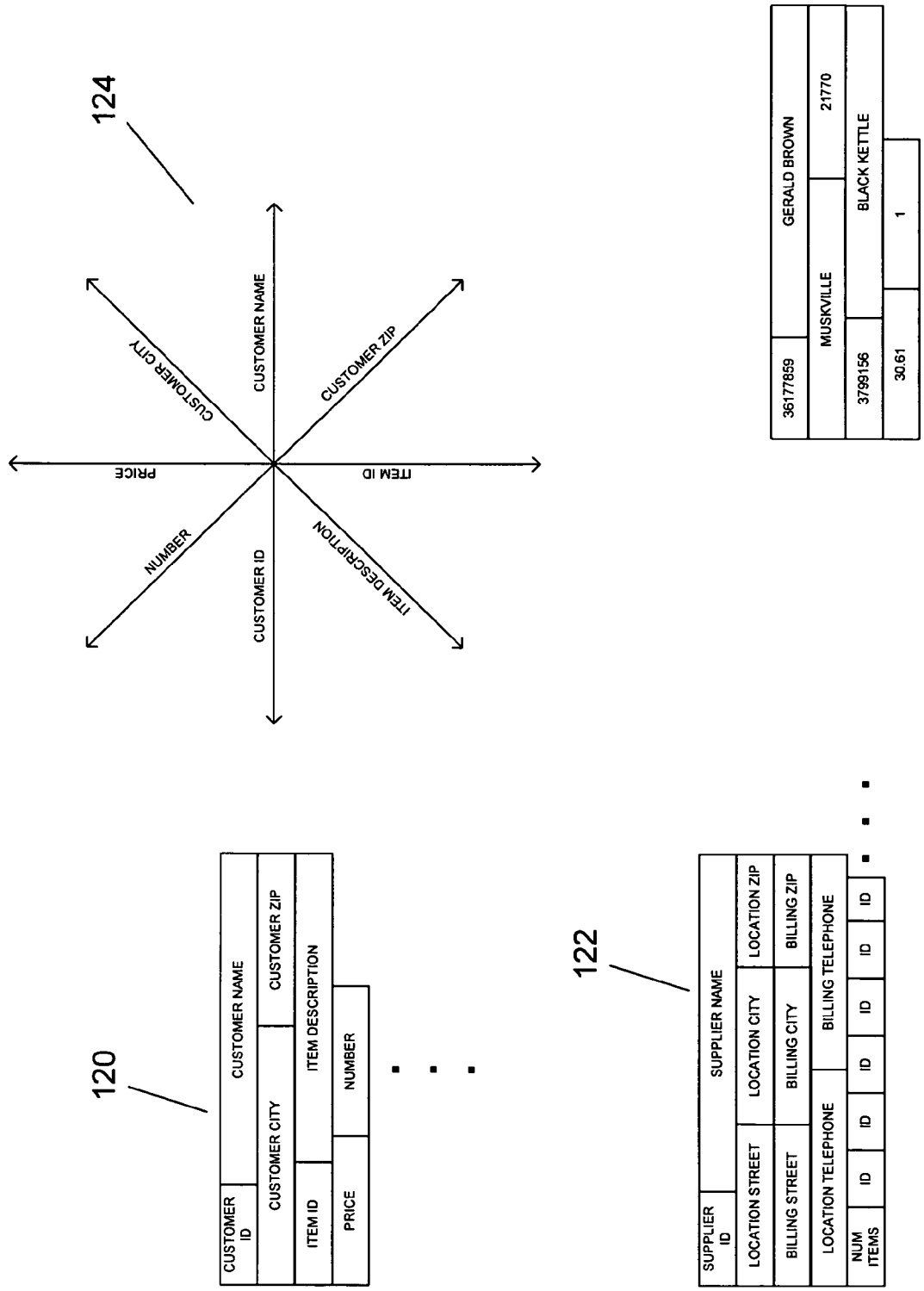

The initially transformed data is then generally further processed, by a typical data warehouse, in order to store the data according to a dimensional model. FIG. 1D illustrates an exemplary dimensional model. Each general type of data, such as retail-transaction data, is processed and formatted in order to be stored as records having a particular record format or, more abstractly, in order to be stored according to a dimensional model. In FIG. 1D, a record template 120 is shown for retail transaction data. The record template includes fields for a customer ID, customer name, the city and zip code of a customer, an item ID, an item description, an item price, and the number of items purchased in the transaction. Of course, any particular data warehouse may choose any number of different record formats for any particular type of data item that the data warehouse harvests from information sources and stores for subsequent retrieval. In general, a number of record formats will be determined, each different record format corresponding to a different type of data. For example, in FIG. 1D, another record 122 is designed to store supplier data. The retail-transaction record 120 can be alternatively viewed as a number of dimensions 124 that define a space, each dimension corresponding to a field of the record. A point in the space is described by particular values for each of the dimensions, just as a point in Euclidian three-dimensional space is described by the particular, real-number of values for the three Euclidian dimensions, commonly described as (x,y,z) coordinates relative to the x, y, and z axes. Thus, a particular data item is a point in the generally high-dimensional space of the dimensional model or, alternatively, a stored-record instance, referred to as a "fact," containing particular values, such as record 126 in FIG. 1D, which is a retail-transaction record containing particular values for each of the fields defined by the record template 120. In general, the fields, or dimensions, are strongly typed, so that the various, weakly-typed values produced by initial transformation need to be further transformed to be stored as particular data types according to the dimensional model.

The process of harvesting and storing data generally involves applying various different types of constraints and rules, to ensure that harvested data is internally consistent, is consistent with other harvested data and data already warehoused, and exhibits a reasonable level of normalization in order to prevent introduction of subsequent inconsistencies and anomalies when the data is warehoused. The degree to which data stored in data warehouses are normalized is generally less than the degree to which data stored in relational databases for OLTP applications are normalized, since, in the latter case, transactions tend to affect only a tiny portion of the stored data, and prevention of update, deletion, and insertion anomalies is vital. Normalization generally produces a greatly increased number of tables and correspondingly complex retrieval operations, and data warehouses tend to be optimized for fast and efficient information retrieval by increasing information-retrieval efficiency at the potential expense of increased stored-data redundancy and increased exposure to various types of insertion, deletion, and date anomalies. However, since data warehouses are generally updated only periodically, in massive batch operations, rather than continuously, as in the case of OLTP systems, verification and checking can be carried out essentially off-line by data warehouse.

Figure 1E:
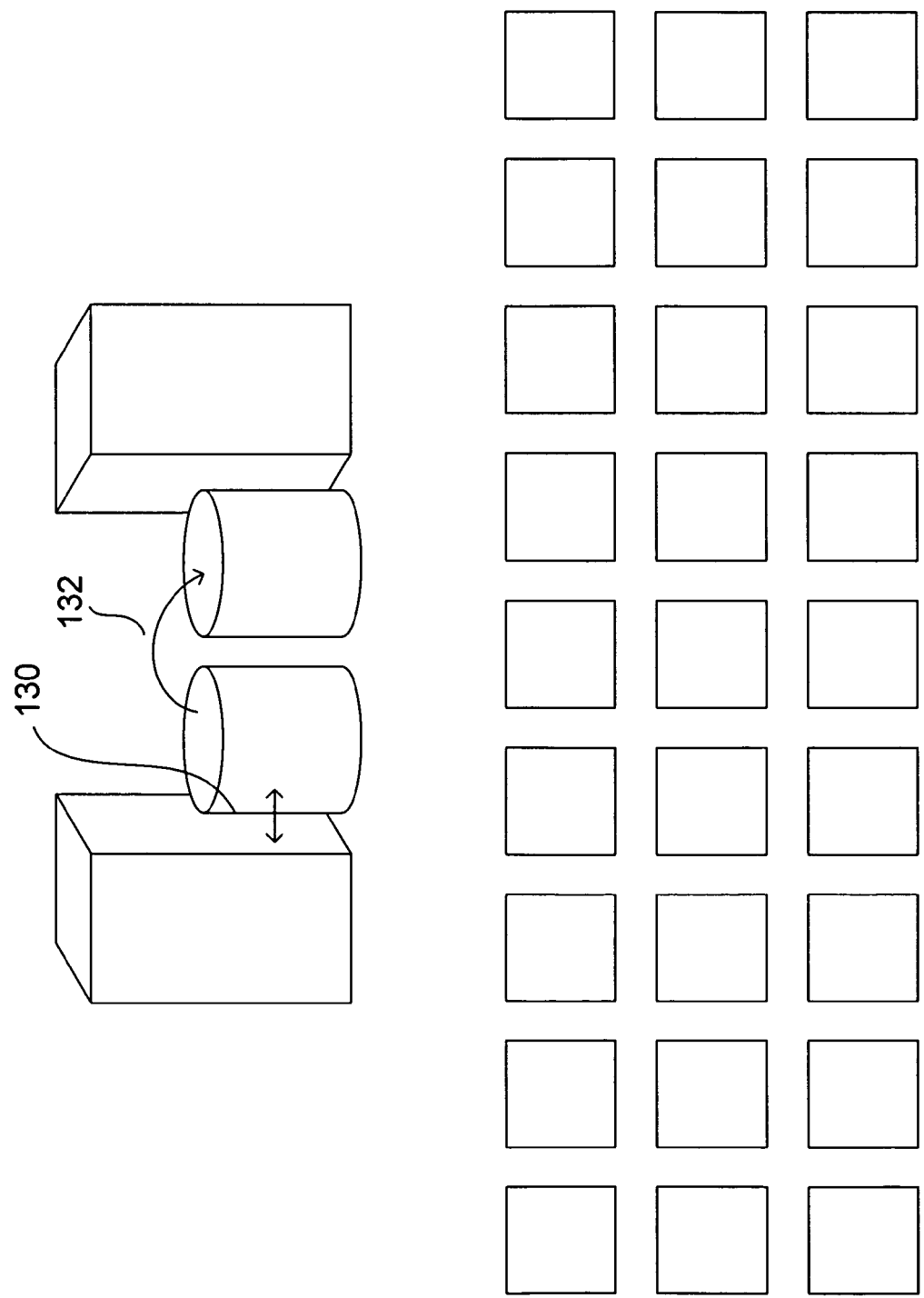
Figure 1F:
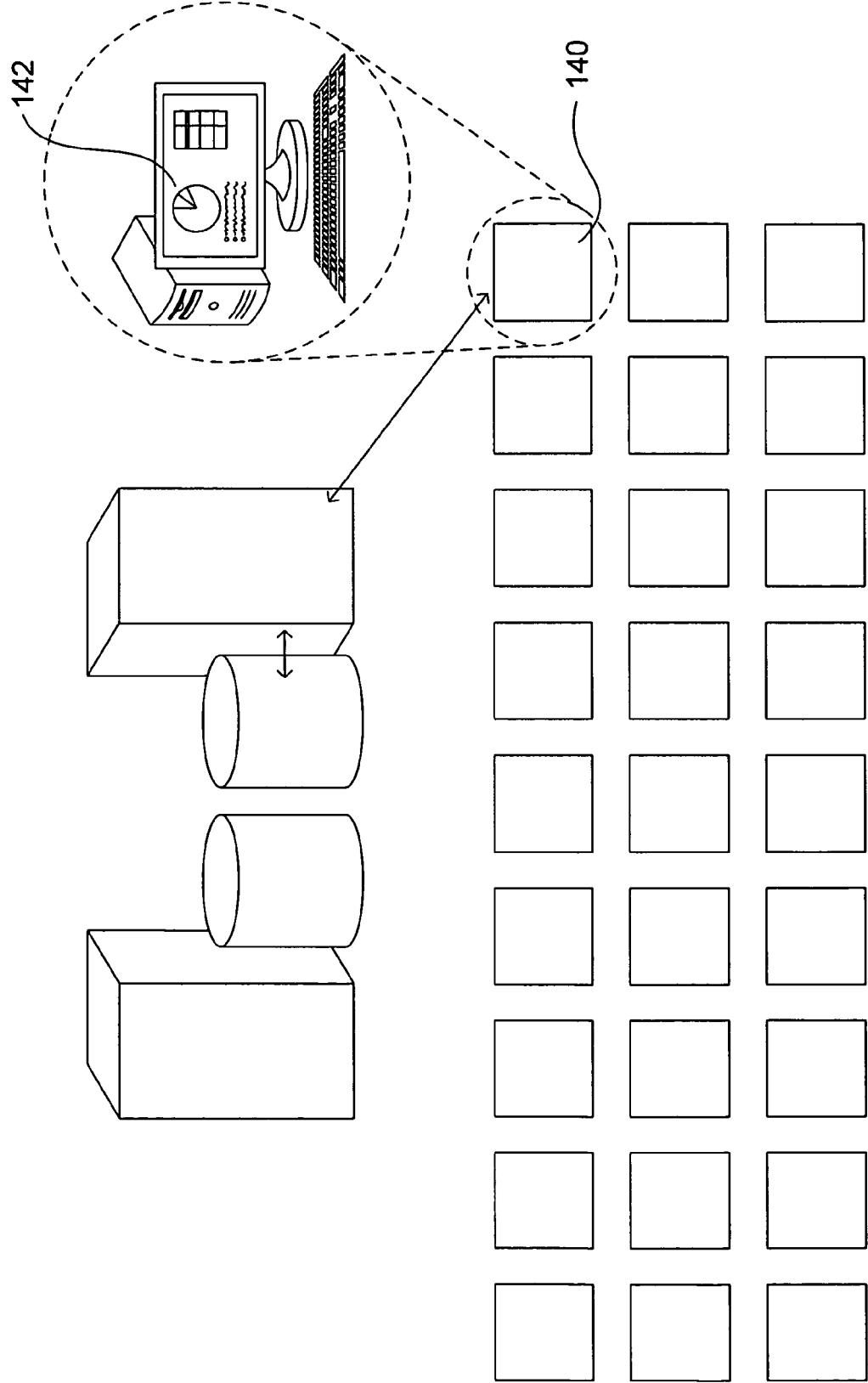

As shown in FIG. 1E, which logically represents a next step following the information harvesting step shown in FIG. 1A, the initially received information from the information sources is extracted and transformed 130, as discussed above, and then loaded 132 into a final stored form within the data warehouse. In many cases, data warehouses use either relational database management systems or systems built on indexed files to store the fully processed data. Then, as shown in FIG. 1F, business-intelligence applications, or other applications that access data stored in a data warehouse, can, on behalf of users, such as the user represented by square 140 in FIG. 1F, access the data warehouse to retrieve information for monitoring, analysis, and prediction of business and operational characteristics in order to provide monitoring, analysis, and/or prediction results 142 to the user.

Figure 1G:
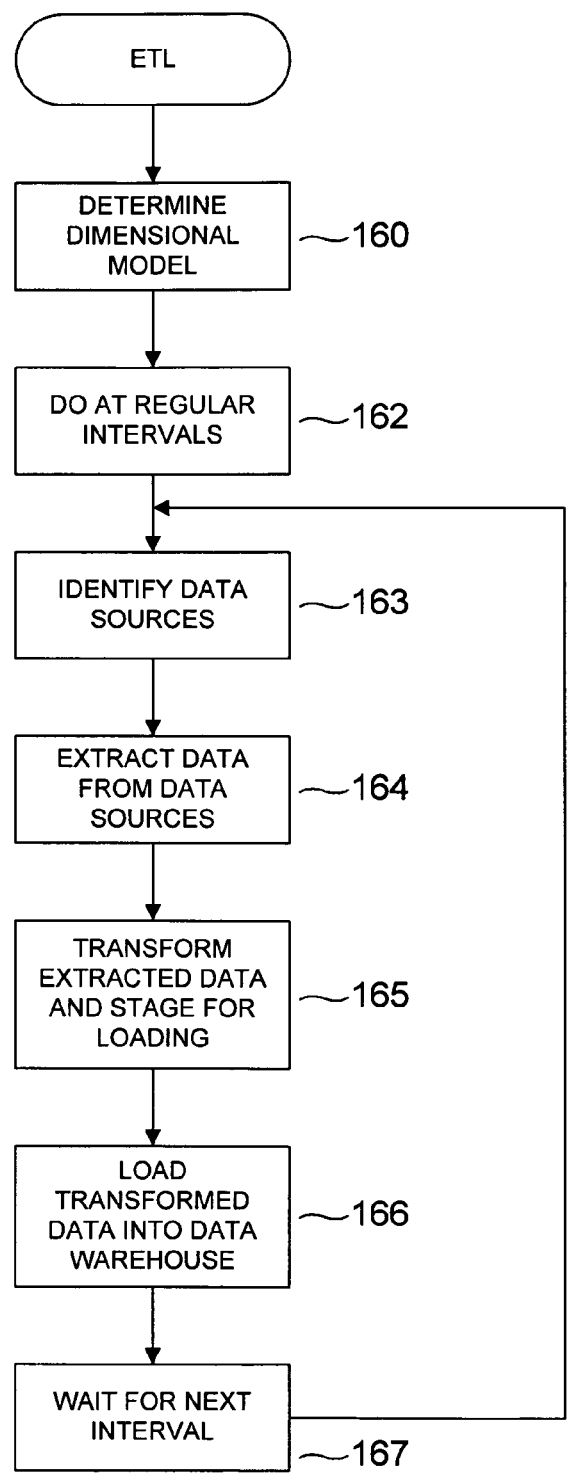

FIG. 1G summarizes the extract, transform, and load operations periodically carried out in order to add new data to the data stored within a data warehouse. In step 160, a dimensional model for the data stored in a data warehouse is determined. Normally, this step is carried out once, or infrequently. The dimensional model is laid out in order to describe the contents of the data warehouse, so that information-retrieval operations can be efficiently carried out by various application programs via data-access mechanisms provided by the data warehouse. As one example, the dimensional model may be specified in terms of RDBMS tables, allowing application programs to retrieve information from the data warehouse using SQL queries. Alternatively, the dimensional model may specify the format and contents of data records stored in indexed files of various types, accessed through information-retrieval facilities provided by the data warehouse.

Next, in the continuous loop of steps 162-167, data is executed, at regular or period intervals, from data sources in order to harvest data from various information sources, transform the initially extracted information, and load the transformed data into the data warehouse, to make the data available for access by any of various different types of application programs and, in certain cases, for relatively direct access by users. The interval may vary, depending on the data warehouse, and the particular types of applications supported by the data warehouse. The interval may range from tens of minutes, to hours, days, weeks, months, or longer periods of time. During each extract-transform-and-load operation, the data sources are identified, in step 163. Then, in step 164, data is extracted from the identified information sources. Various different types of information sources may provide data through various different mechanisms and interfaces. In certain cases, the data warehouse accesses various types of application programs and business systems through application-program interfaces ("APIs"). In other cases, the data warehouse may simply download files or directly solicit information from users and personal computers. Next, in step 165, the data extracted from information sources is transformed and staged for subsequent loading into the data warehouse. Transformation may involve application of various rules and/or data-processing functions to the extracted data, in order to select only relevant data from the initially extracted data, normalize data types and information encoding, encode unencoded information, derive intermediate, computed values from extracted values, sort and filter extracted data, aggregate and otherwise compile extracted data into derived data and values, apply various types of data verification, authentication, and validation, and to carry out various types of data normalization. Finally, in step 166, the transformed data is loaded into the data warehouse. The loading process may, depending on the amount of data and the size of the data warehouse, take minutes to hours to even longer periods of time. When the data warehouse is implemented using an RDBMS, it may be necessary to relax various types of integrity constraints and triggers generally applied by the RDBMS in order to carry out the data load in a reasonable amount of time. In various different types of data warehouses, data may be removed from the data warehouse at regular intervals, or concurrently with the load operation. In addition, data may be archived, in those systems that require data histories and data tracking, and various types of audit reports, integrity monitoring, and repair functions may be carried out in synchrony with the update intervals, or at other intervals or times. As should be clear from the above discussion, data warehouses are generally not constructed to allow for continuous update, as are OLTP systems and other database-management-system applications.

Figure 2:
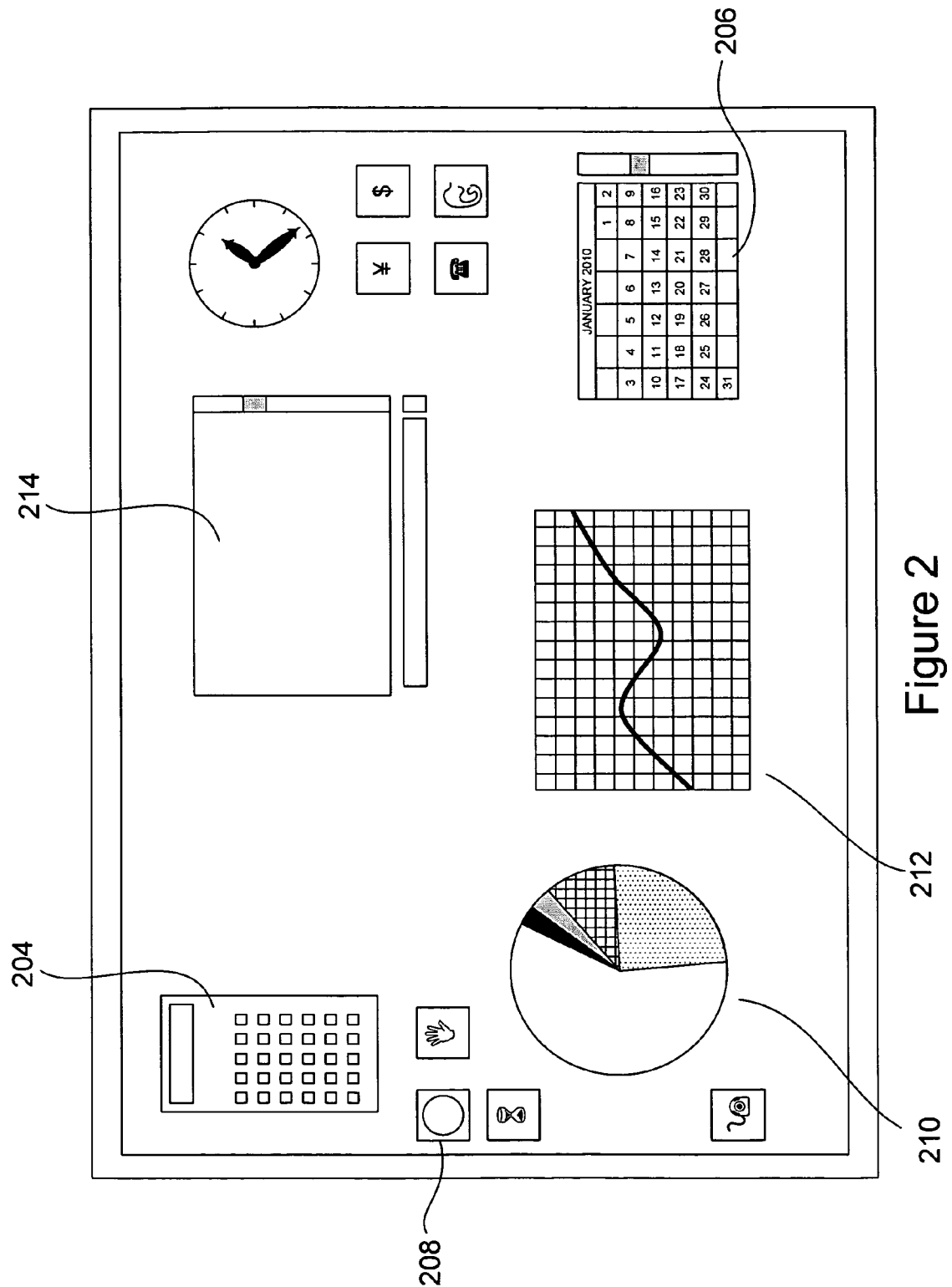
FIG. 2 illustrates an exemplary dashboard graphical user interface ("GUI").

As discussed above, recent trends in computing include an increased expectation by users of computers to be able to communicate with one another over networked computers and to share data with one another through network communications, as facilitated by, and in the context of, distributed application programs. A product of this trend is a class of business applications referred to as "dashboard" applications. FIG. 2 illustrates an exemplary dashboard graphical user interface ("GUI"). The business dashboard provides a variety of features and facilities that enable business users to monitor, analyze, and predict market trends, business operations, and other operational characteristics of organizations, production facilities, and business concerns. For example, the exemplary dashboard GUI shown in FIG. 2 includes calculator functionality 204, an electronic calendar functionality 206, and various icons, such as icon 208, through which other types of useful functionality can be launched by the dashboard user. In addition, a dashboard may continuously display results computed by one or more business-intelligence applications or other business applications 210 and 212. In addition, the dashboard provides one or more input facilities, such as input window 214, to allow dashboard users to create data, or UCC, and annotate output from business-intelligence applications with the UCC, export the UCC to other dashboard users, use the UCC to direct update stored information used by business-intelligence applications and other applications, and even create new information that is stored for subsequent access by the dashboard user and/or other, remote users.

Figure 3:
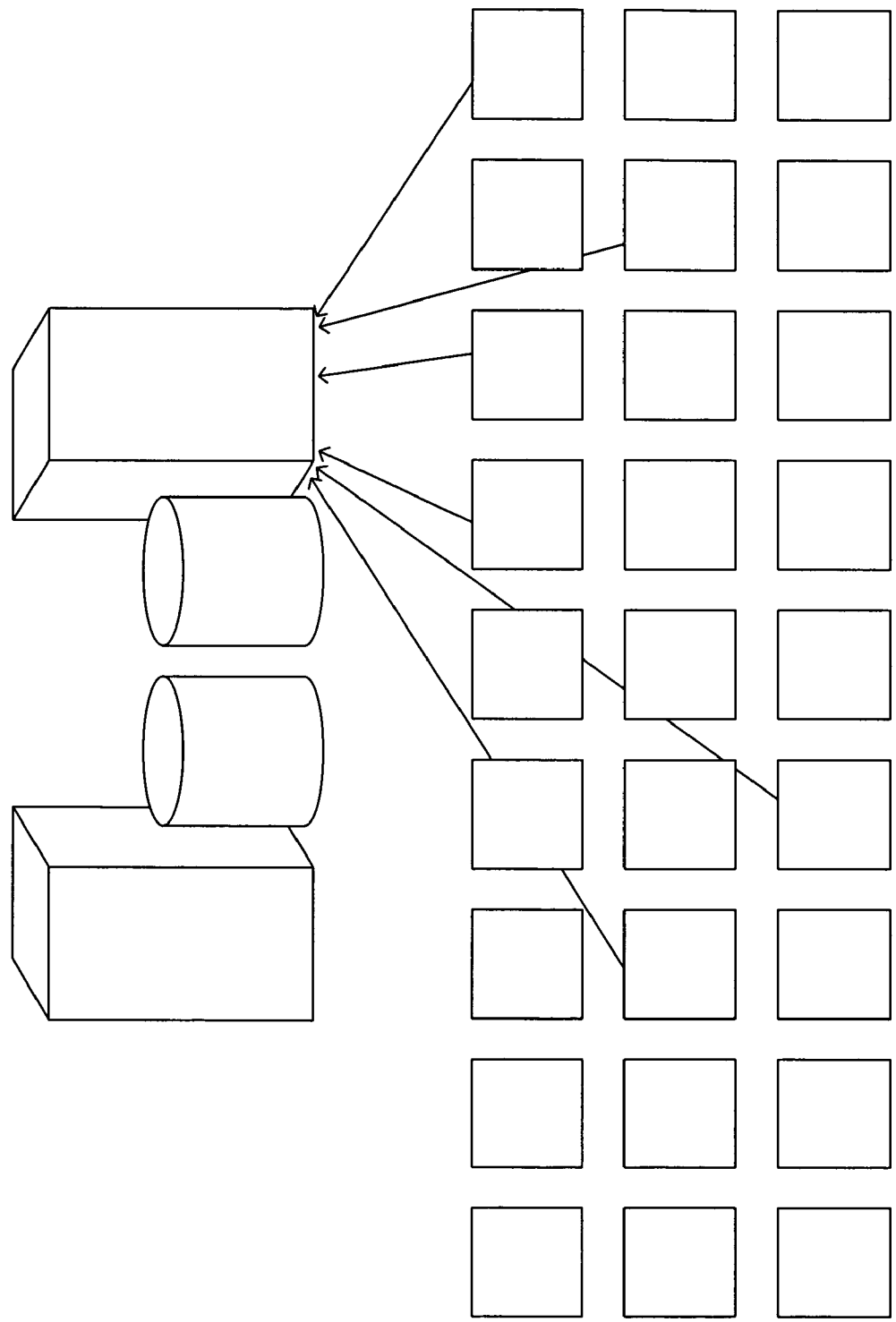
FIG. 3 illustrates, using the illustration conventions employed in FIGS. 1A, E, and F, the impact of dashboards and other such interactive applications on data warehouses on which various business-intelligence and other business applications are based.

FIG. 3 illustrates, using the illustration conventions employed in FIG. 1A, E, and F, impact of dashboards and other such interactive applications for data warehouses on which various business-intelligence and other business applications are based. Interactive facilities that allow for user creation of content that may be used to annotate, supplement, or update data stored in data warehouses contradict the extract-transform-and-load model for adding data to a data warehouse. The advent of UCC essentially produces a situation in which users and application programs that retrieve data from the data warehouse also serve as information sources, and, significantly, may provide information continuously, rather than at defined information-harvesting intervals. While, in certain applications, it might be possible to store UCC locally, within a user's computer, and download the UCC as part of the typical data-warehouse information-harvesting cycle, the UCC would be made available to other users only after significant lag times and thus thwart the real-time or near-real-time data-distribution characteristics desired of interactive applications, such as dashboards, by users of interactive applications.

Embodiments of the present invention are directed to reconciling the need for real-time or near-real-time collection, storage, retrieval, and distribution of UCC in the context of data-warehouse-based, distributed business-intelligence systems or other such systems in which UCC is desired to be exchanged, in real time or near-real time, between distributed users, but also needs to be incorporated into the data warehouse according to the dimensional model associated with a data warehouse and the various types of integrity constraints, verification, validation, and authentication processes carried out by the data warehouse. As discussed above, real-time or near-real-time collection, storage, retrieval, and distribution of UCC contradicts the traditional data-extraction, data-transformation, and data-loading cycles of traditional data-warehouse implementations.

Figure 4:
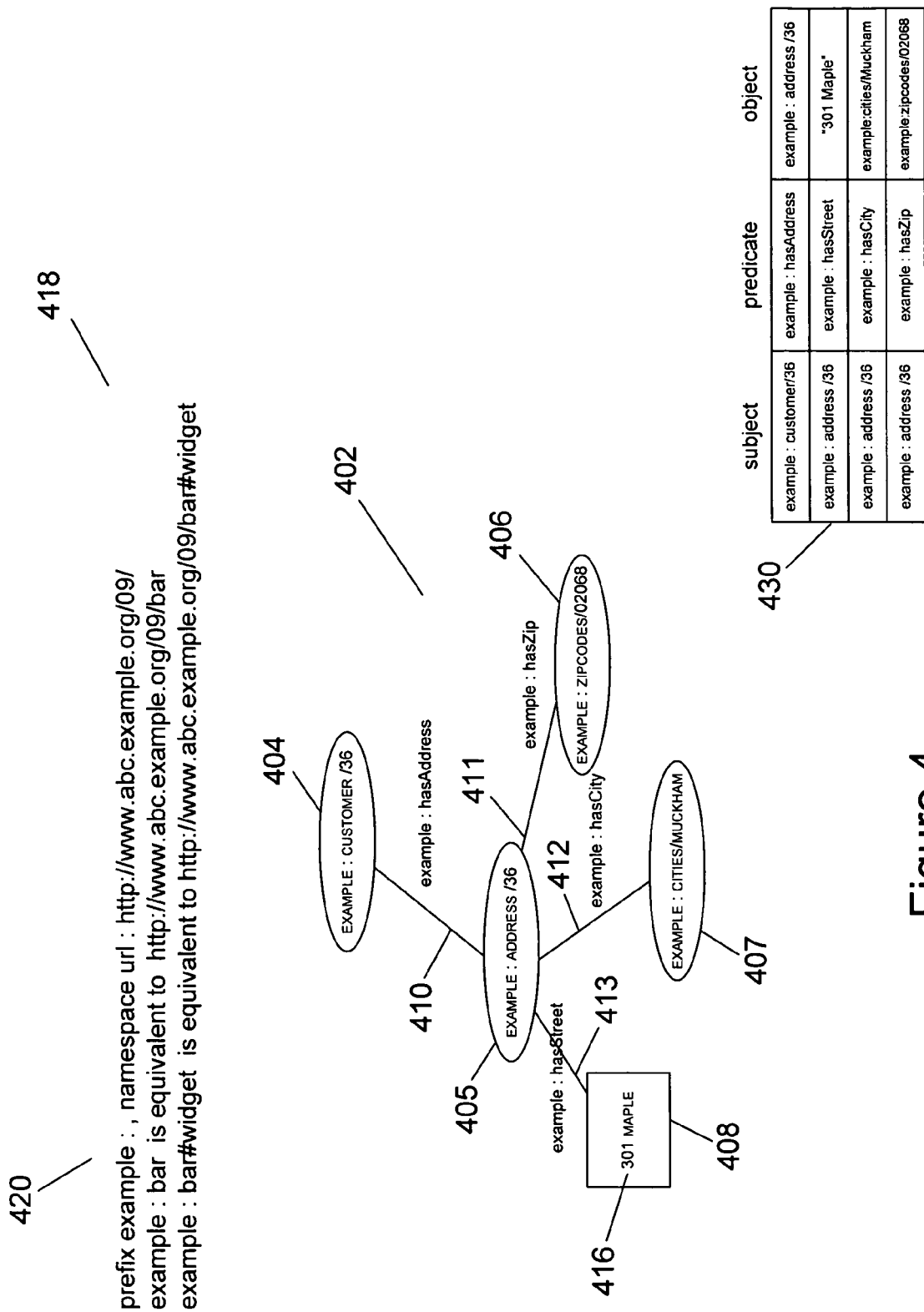
FIG. 4 shows an RDF model.

FIG. 4 shows an RDF model. The RDF model is intended to illustrate basic concepts of the resource description framework ("RDF") data model. RDF models relationships between entities that can be described by uniform resource identifiers ("URIs"), a general class of identifiers of which the familiar uniform resource locators ("URLs") constitute a subclass. Each URI comprises a text strings with an optional fragment appended to the text string and separated from the text string by the delimiter "#." An RDF model logically comprises a graph, such as graph 402 in FIG. 4, which includes nodes, such as nodes 404-408 in graph 402, interconnected by edges, such as edges 410-413 in graph 402. The nodes are associated with URIs or with literals, such as the literal "301 Maple" 416 in node 408 of graph 402. The edges are also associated with URIs. The URIs, in general, refer to documents or other information available on the World Wide Web.

A convention used in RDF is to assign URI values to short prefixes, such as assignment of the URI "http://www.abc.example.org/09/" 418 to the prefix "example:" 420 in FIG. 4. Thus, the URI associated with node 404 in graph 402 is, when the prefix "example" is substituted with its URI value, "http://www.abc.example.org/09/customer/36."

An RDF graph can be alternatively expressed as a list of triples. Table 430 in FIG. 4 contains four triples, each triple displayed in a row of the table, which define graph 402. Each triple comprises a subject, corresponding to a node of the graph, a predicate, corresponding to an edge in the graph, and an object, corresponding to another node in the graph, with the subject node connected to the object node by the edge corresponding to the predicate. RDF provides for a variety of additional data-model-expression functionalities, including class definitions and class instancing, reification, various types of sets, loose data typing, and various other such functionalities. RDF graphs can be serialized and encoded using RDF/XML, a subset of the extended markup language ("XML") currently used to encode a plethora of various types of information in various computational contexts. RDF graphs can be created, manipulated, and queried using various query languages, including the RDF query language SPARQL. SPARQL allows for writing queries that return sets of triples from an RDF graph that match various specified patterns and parameters. Together, RDF, RDF/XML, and SPARQL provide the foundation for a data-storage facility, or, in other words, a database management system. This database management system is based on a semantic model, rather than on the dimensional model, which is used for data storage and retrieval in traditional data warehouses. In general, the dimensional model is more constrained, features stronger data typing, and is somewhat less flexible than the semantic model. However, the semantic model can be supplemented, by programming and by formulating proper SPARQL queries, to enforce arbitrary constraints, and to constrain RDF graphs to be equivalent to data stored according to the dimensional model. A database or data-management system based on RDF, RDF/XML, and SPARQL can be constructed to provide the ease and efficiency of update needed for real-time or near-real-time storage and retrieval of UCC, while, at the same time, storing the UCC within a logical framework that can be straightforwardly translated into equivalent dimensional-model instances, or facts, stored by data warehouses.

Figure 5:
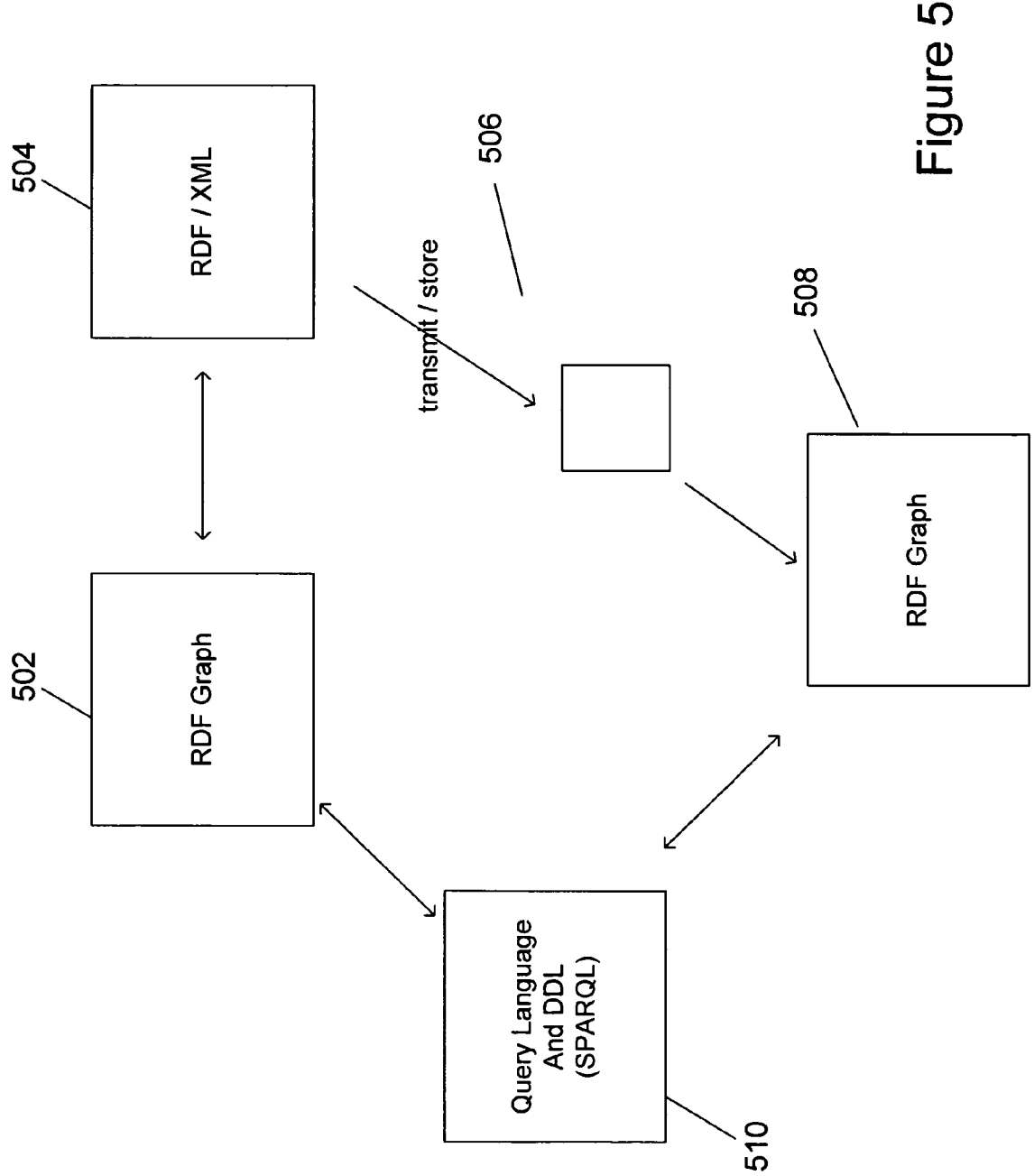
FIG. 5 illustrates relationships among SPARQL, RDF, and RDF/XML.

FIG. 5 illustrates relationships among SPARQL, RDF, and RDF/XML. Logically, a set of data can be stored in an RDF graph comprising a set of RDF triples 502. The data may be physically stored as an RDF/XML encoding of the graph 504. The RDF/XML encoding can be used to transmit the RDF graph electronically or for storing the RDF graph in mass-storage devices or computer memory 506. Stored or transmitted RDF/XML encoding can be subsequently accessed as an RDF graph 508. The SPARQL query language and data-definition language 510 is used to construct and manipulate RDF graphs as well as to query RDF graphs for particular information.

Figure 6:
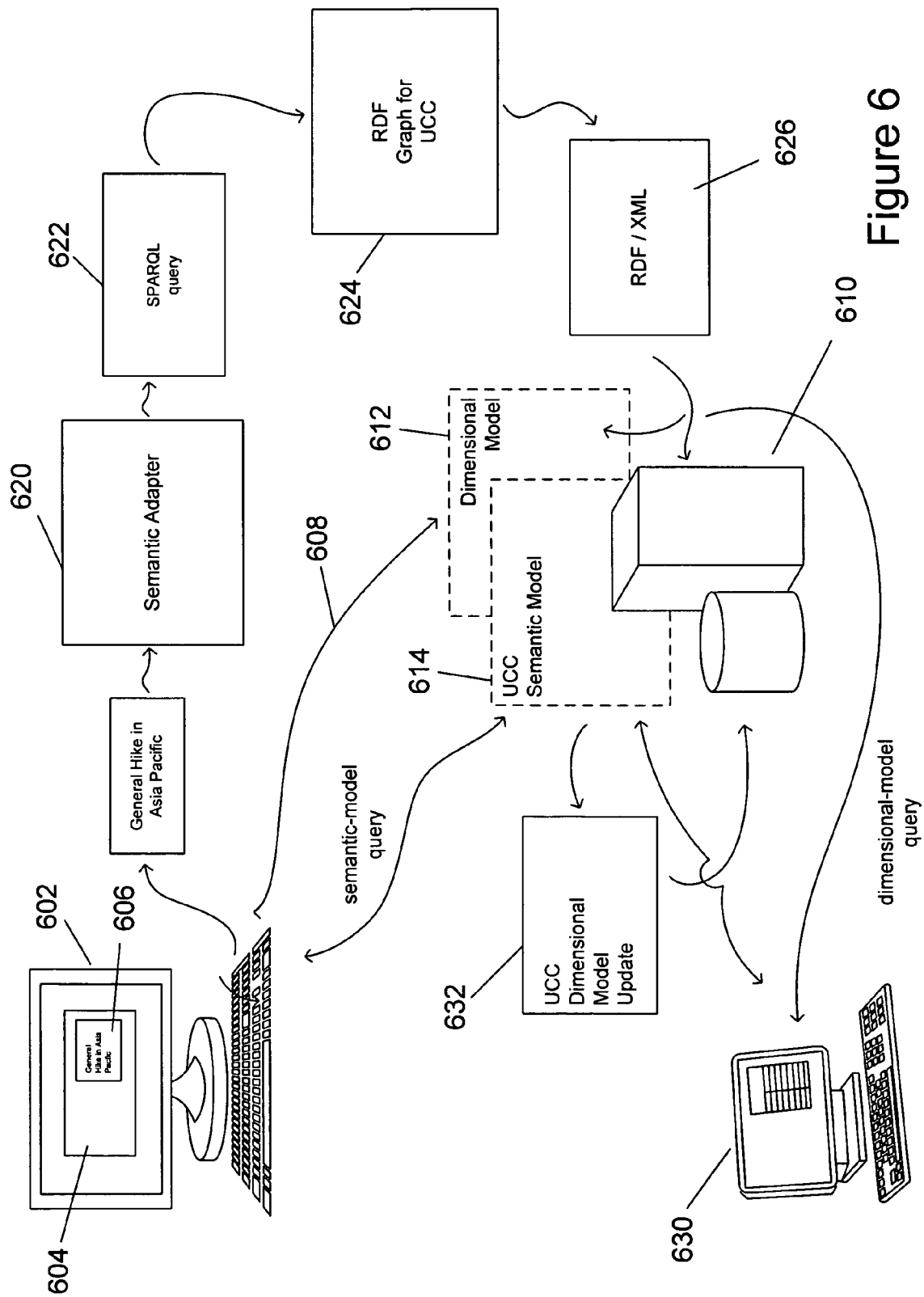
FIG. 6 illustrates a family of embodiments of the present invention.

FIG. 6 illustrates a family of embodiments of the present invention. In FIG. 6, a first user's computer 602 displays the GUI of a dashboard application 604, including a text-entry feature of which the user has entered the UCC "General Hike in Asiapacific 602." As shown in FIG. 6 by curved arrow 608, the information used by business-intelligence functionality incorporated into the dashboard is obtained by the dashboard application from a data warehouse 610, which stores information according to a dimensional model 612. The UCC is desired, by the user, to be communicated to other, remote dashboard users in real-time or near-real-time, and is desired by the dashboard user to be incorporated into the information stored with the data warehouse, for subsequent retrieval by the dashboard application. As discussed above, a traditional data warehouse lacks the efficient, continuous data-update features that would make real-time and near-real-time collection and distribution of UCC possible. However, in embodiments of the present invention, the data warehouse, an alternative centralized data-storage facility, or a distributed data-storage facility that runs on some or all of the users' computers, maintains a UCC data-storage facility, based on a semantic model, rather than a dimensional model 614, for collecting and temporarily storing UCC until the UCC can be subsequently extracted from the semantic-model-based data-storage facility, transformed, and loaded into the dimensional-model-based data-storage facility of the data warehouse. In the example shown in FIG. 6, the UCC semantic-model-based data-storage facility 614 is shown to reside within the computing facilities of the data warehouse. The exemplary UCC 606 is transmitted, by the dashboard application, to a semantic adaptor 620, which transforms the UCC into a SPARQL query 622 for generation of an RDF subgraph 624 that can be encoded in RDF/XML 626 and transmitted to the data warehouse 610 for incorporation into the UCC semantic-model-based data-storage facility 614 or executed directly against the UCC semantic-model-based data-storage facility. Once incorporated into the UCC semantic-model-based data-storage facility, the UCC can be accessed, in the context of business applications and dashboards, by other users and computer systems, such as by a user of computer 630. Thus, embodiments of the present invention provide an on-demand, or on-click incremental dimensional-model update by which a user of a dashboard application can, with a mouse-click input or other input to a dashboard user interface, update a dimensional model, with updates immediately available for access by other users.

Ultimately, at periodic intervals, the data contained in the UCC semantic-model-based data-storage facility 614 can be transformed and incorporated into the dimensional-model-based data-storage facility 612 by a UCC-dimensional-model-update component 632 of the data warehouse 610. Thus, according to embodiments of the present invention, the data warehouse, or another distributed system, maintains a UCC semantic-model-based data-storage facility that temporarily stores UCC and provides real-time or near-real-time access to the temporarily stored UCC until the UCC is transformed and incorporated into the dimensional-model-based data-storage facility of a data warehouse.

Of course, there are many variations and alternative embodiments to this system. For example, the semantic adaptor 620 may execute on a user's computer, within the address space of the dashboard, a separate address space on the user's computer, or may, alternatively, execute on a remote computer or within the computational facilities of a data warehouse. In other embodiments, the semantic adaptor may construct an appropriate SPARQL query and immediately execute that query against the UCC-semantic-model-based data-storage facility, rather than use the SPARQL query to create an intermediate RDF/XML encoding of the UCC for transmission to the UCC semantic-model-based data-storage facility. The integration of data from the UCC semantic-model-based data-storage facility to the dimensional-model-based data-storage facility of the data warehouse may occur, in certain embodiments, as part of the normal extract, transform, and load cycle of the data warehouse or, alternatively, may be carried out separately, according to a different update interval. In certain embodiments of the present invention, update of the dimensional-model-based data-storage facility is not carried out by an update process 632, but is instead carried out when the user computer 630 accesses data stored in the UCC semantic-model-based data-storage facility, or, in alternative embodiments, subsequent to data creation and storage in the UCC semantic-model-based data-storage facility by the data-creating system 602.

Figure 7:
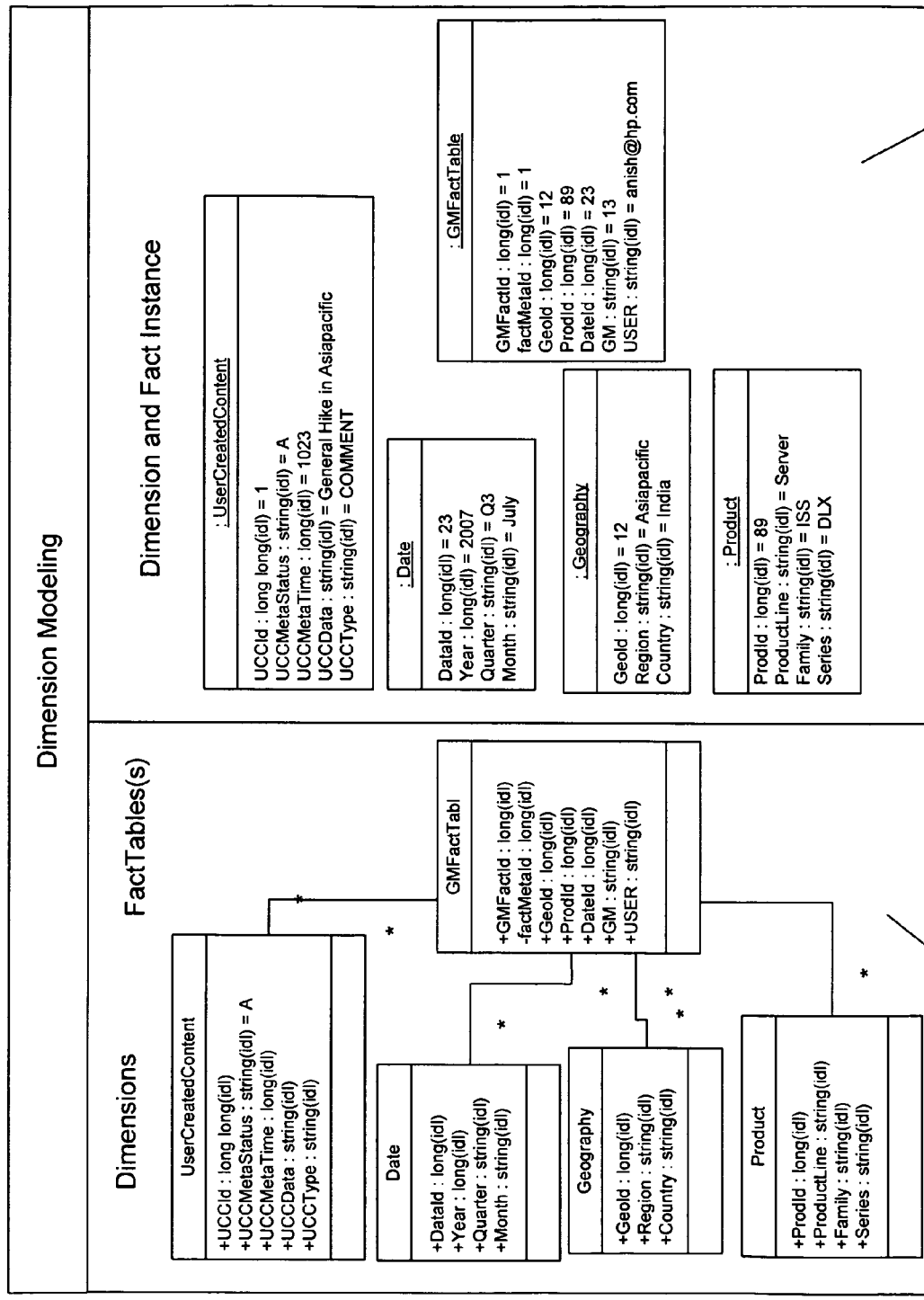
FIG. 7 illustrates an exemplary dimensional model for user-created content and a user-created-content instance of the dimension model.

FIG. 7 illustrates an exemplary dimensional model for user-created content and a user-created-content instance of the dimension model. As shown in FIG. 7, the UCC dimension model incorporates UCC related to a particular subject as entries in a UCC table, described in terms of interconnected records in graph 702 in FIG. 7. A specific instance of a UCC, according to this model, is shown as the collection of instantiated records 704 in FIG. 7.

Figure 8:
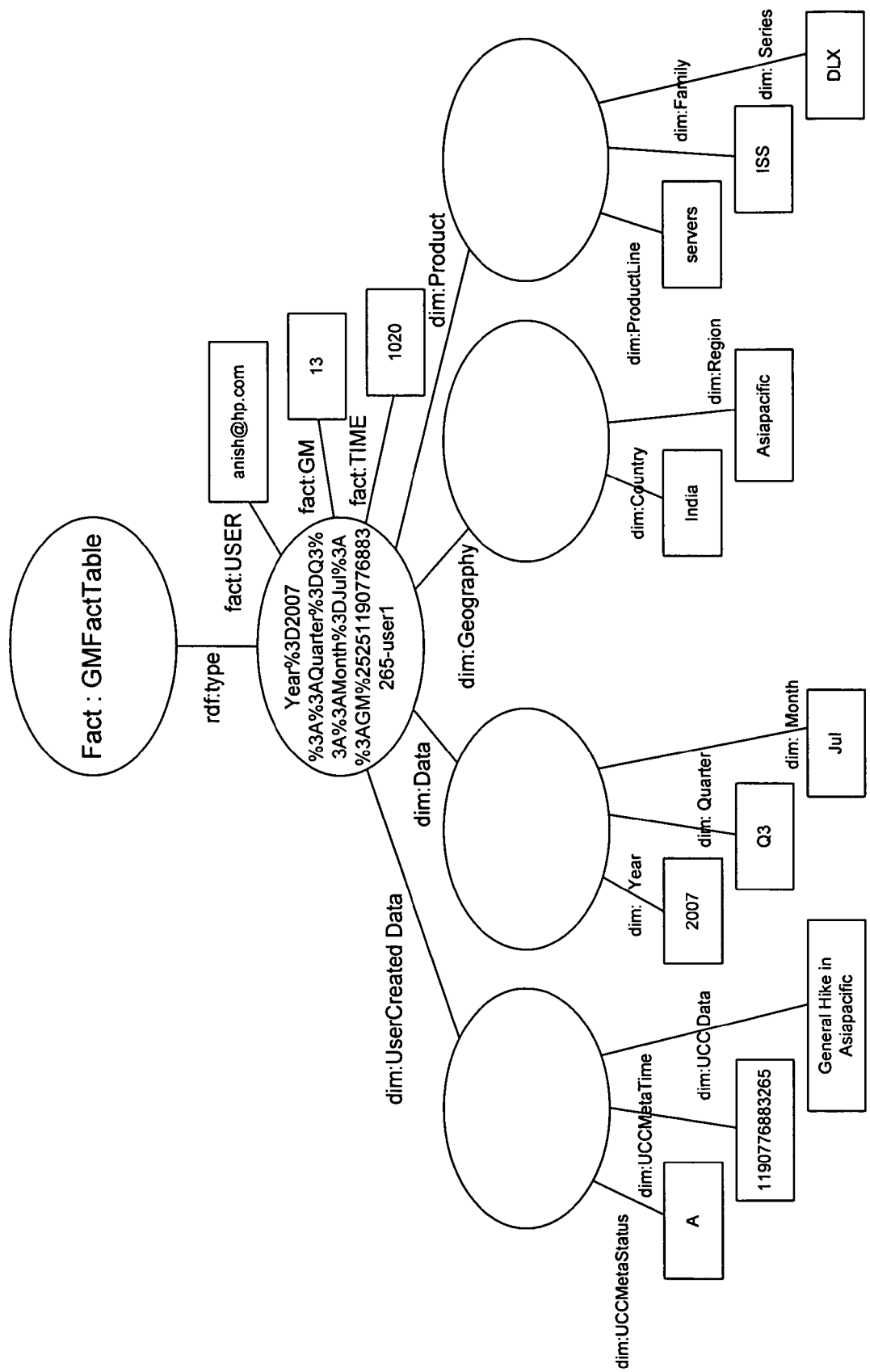
FIG. 8 illustrates an RDF subgraph equivalent to the user-created-content instance of the dimension model shown in FIG. 7.

FIG. 8 illustrates an RDF subgraph equivalent to the user-created-content instance of the dimension model shown in FIG. 7. Note that the RDF subgraph does not contain the numeric identifiers used, in the dimensional model, to tie together the instance records. Instead, the RDF graphs relies on graph edges that represent triplet-encoded relationships between nodes. However, the RDF subgraph, shown in FIG. 8, can be readily transformed into a dimension-model instance by generating appropriate identifiers and including the identifiers in the dimensional-model records, along with the information encoded in the RDF subgraph. FIG. 9 shows an RDF/XML expression for the RDF subgraph shown in FIG. 8. FIG. 10 provides an exemplary SPARQL query that can be executed against an exemplary user-created-content semantic-model-based data-storage facility in order to extract the user-created content associated with the table and with a particular month from the semantic-model-based data-storage facility.

Figure 11:
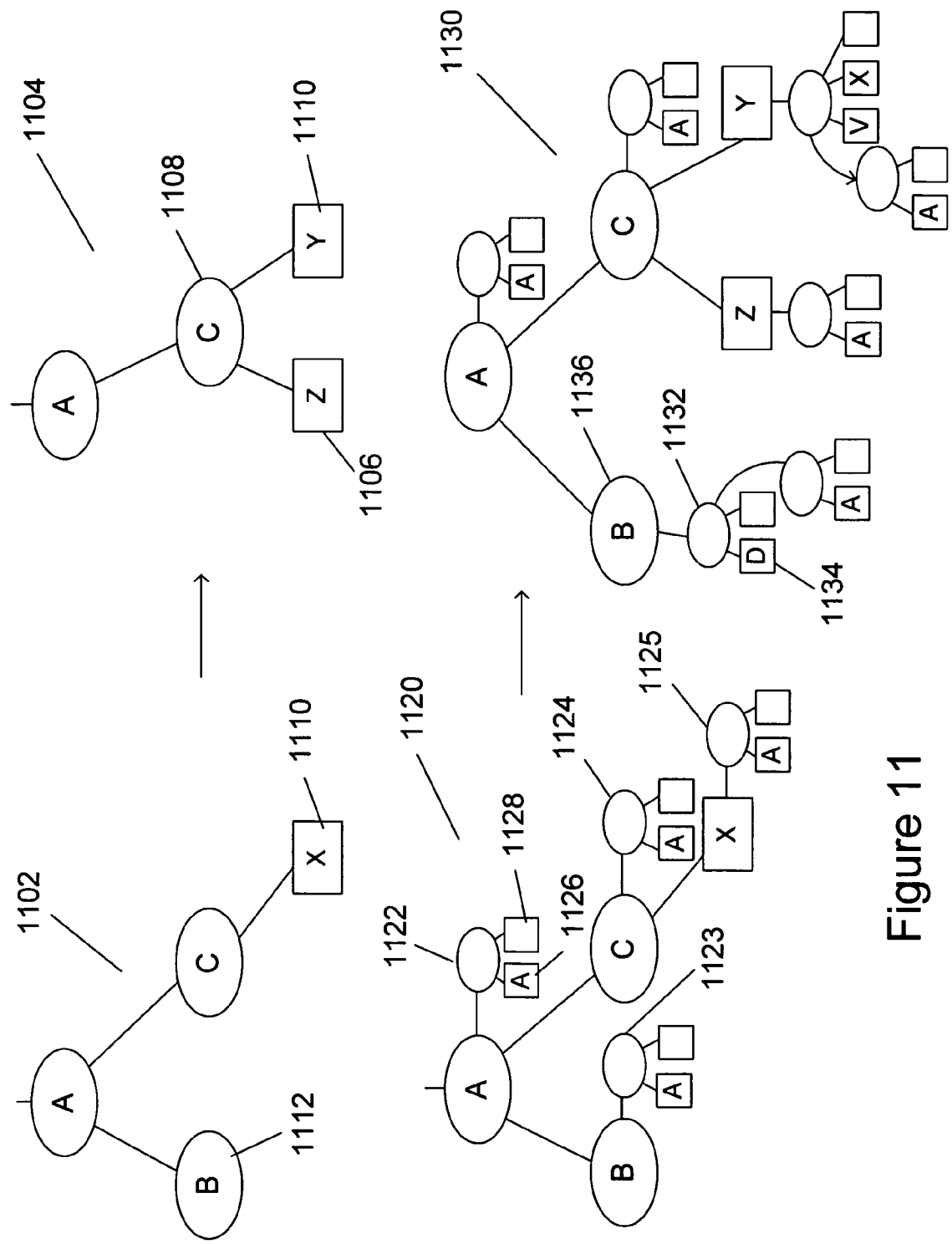
FIG. 11 illustrates two different types of semantic-model transformations.

The semantic model database is capable of supporting both history-preserving and non-history-preserving semantic-model transformations. FIG. 11 illustrates two different types of semantic-model transformations. At the top of FIG. 11, an RDF subgraph 1102 is updated to produce an updated subgraph 1104 by adding a new node 1106 to node 1108, by changing the value represented by node 1110, and by deleting node 1112. In a non-history-preserving transformation, the deletion, addition, and update are carried out without attempting to preserve the previous state of the RDF subgraph. By contrast, the lower portion of FIG. 11 illustrates the same transformation carried out in a history-preserving manner. In this case, each node of the original subgraph 1120 is associated with a status-and-history subgraph 1122-1125. The primary node in each status-and-history subgraph is associated with a status node, such as status node 1126 associated with primary node 1122, and a time stamp node, such as time stamp node 1128 associated with primary node 1122. The node deletion, node addition, and node-value change shown in the top portion of FIG. 11 is carried out again in the bottom portion of FIG. 11 to produce RDF subgraph 1130. In this case, changes to the nodes are reflected in additions of nodes to the status-and-history subgraphs. For example, the status-and-history subgraph that includes node 1123 in the original RDF subgraph 1120 is modified to include a new node 1132 with a status node 1134 that indicates that the associated node 1136 has been deleted. In this fashion, the status-and-history subgraph associated with each node preserves a complete record, from initial creation to deletion, of all changes and values that have occurred. For example, the semantic-model-database is able to store a complete record of the information state of the information stored in the semantic-model-based data-storage facility, should subsequent auditing or alteration-tracking need to be carried out. Edges of an RDF graph may also be associated with status-and-history subgraphs. In certain embodiments of the present invention, the status-and-history subgraphs may contains only the most recent changes, rather than a full set of changes made to the nodes and edges of an RDF graph, and, in alternative embodiments of the present invention, the status-and-change history may be alternatively encoded in tables of triples, separate RDF graphs, or by other means.

FIGS. 12-15 provide an illustration of the types of enhancements that are carried out in order to effect one embodiment of the present invention within a distributed business-intelligence system based on a data warehouse.

Figure 12:
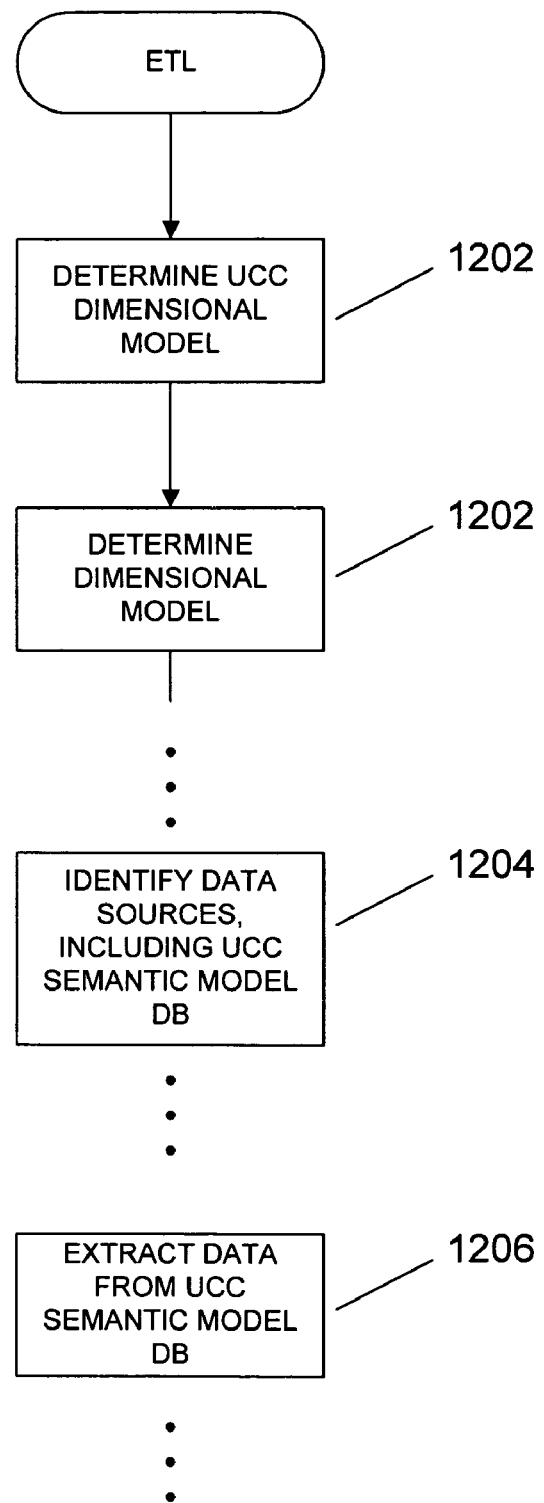
FIGS. 12-15 provide an illustration of the types of enhancements that are carried out in order to effect one embodiment of the present invention within a distributed business-intelligence system based on a data warehouse.

First, as shown in FIG. 12, the extract, transform, and load cycle for the data warehouse needs to additionally include steps for determining the UCC dimensional model 1202, needs to identify the UCC semantic-model-based data-storage facility as a source for information, in step 1204, and needs to extract data from the UCC semantic-model-based data-storage facility in step 1206. Other steps of the extract, transform, and load cycle, shown in FIG. 1G, remain the same in this embodiment. As noted above, extraction, transformation, and loading of UCC from the UCC semantic-model-based data-storage facility can be carried out in a separate cycle at a different interval from the general data-warehouse extraction, transformation, and loading cycle.

Figure 13:
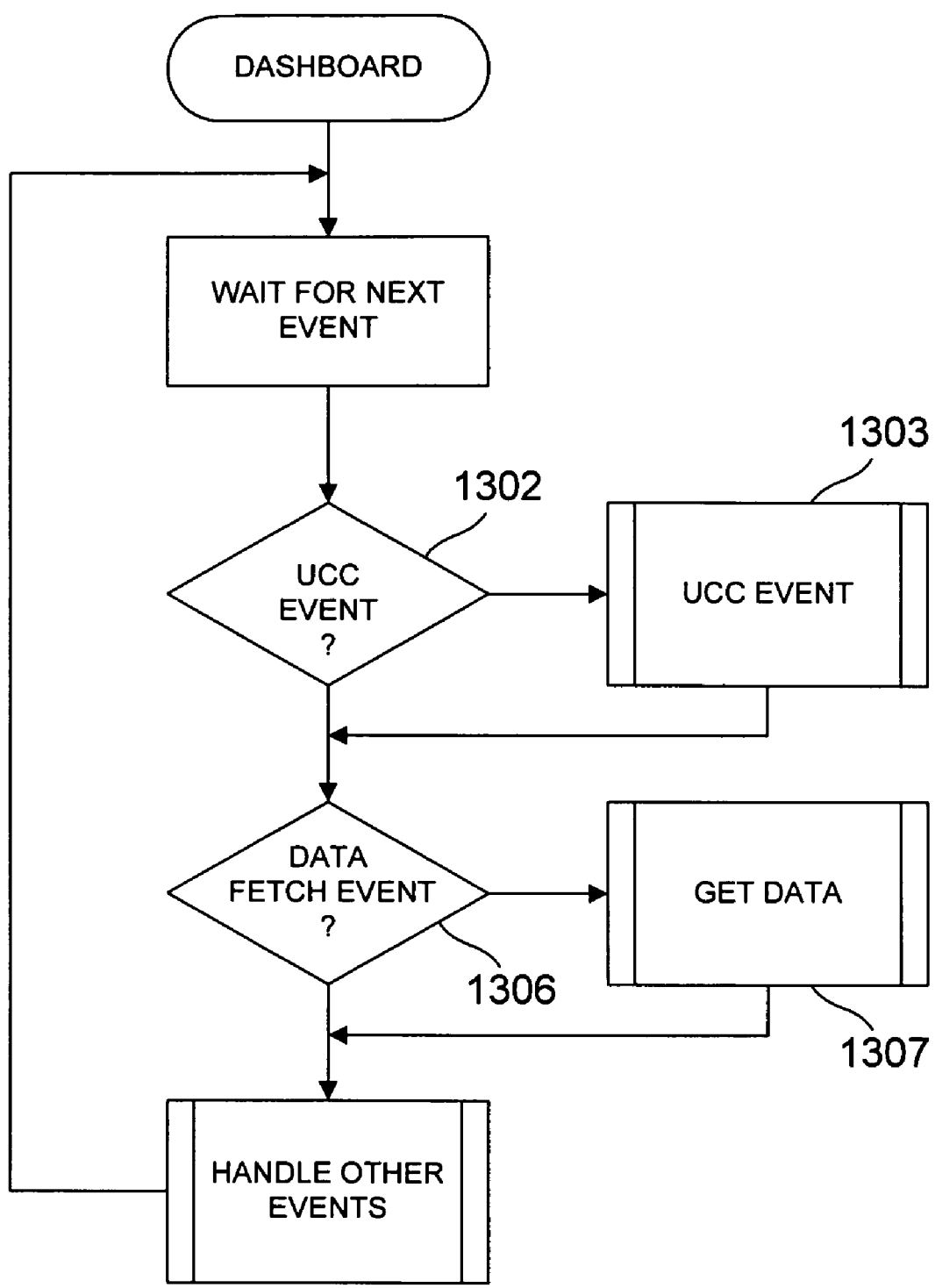
Figure 14:
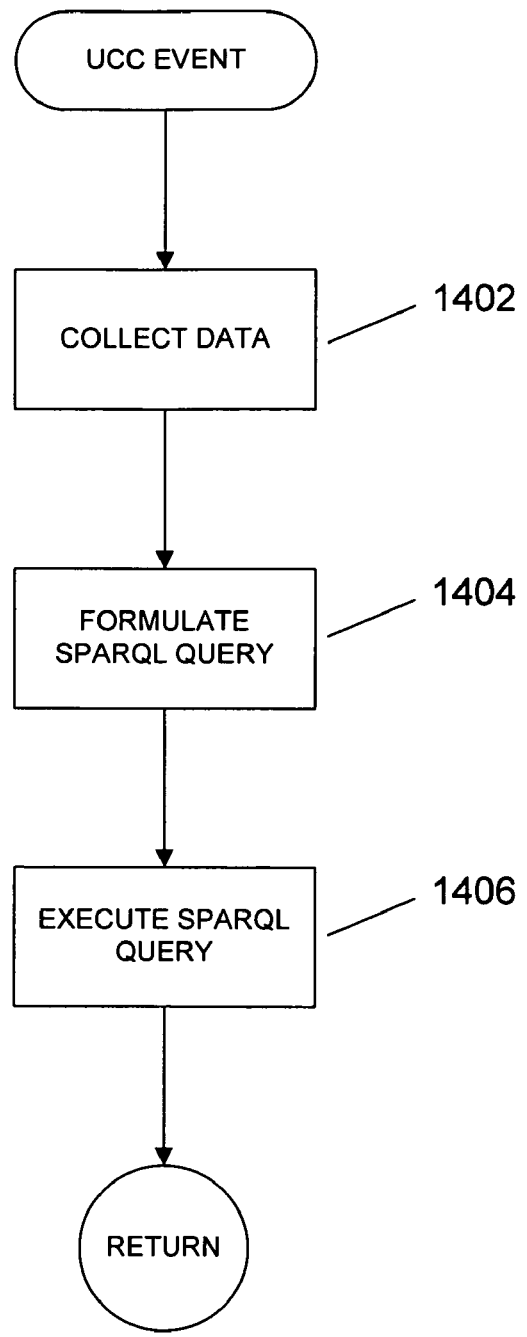
Figure 15:
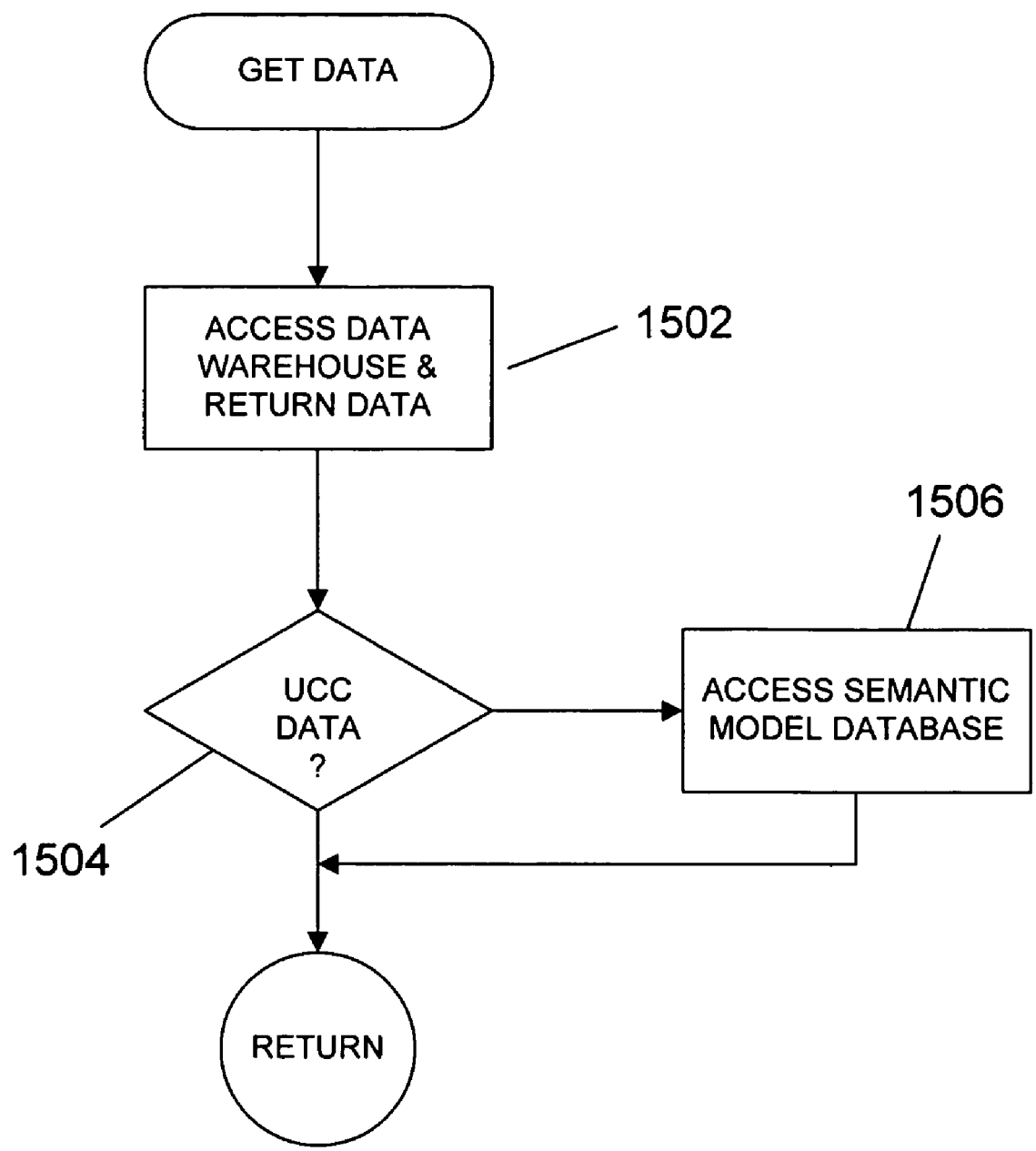

FIG. 13 shows modification of an internal event loop within the dashboard application to accommodate collection, storage, and retrieval of UCC. The event loop continuously operates in order to handle any events that occur within the context of the dashboard application. Two new events are detected and handled in steps 1302-1303 and in steps 1306-1307, respectively. A UCC event is detected in step 1302, is handled by the UCC event handler in step 1303. A UCC event is triggered by input of UCC data to the dashboard. FIG. 14 shows the UCC event handler. In step 1402, the input UCC is collected. In step 1404, a SPARQL query is formulated in order to create an RDF subgraph for encoding an RDF/XML and transmission to a data warehouse or for directly updating the semantic-model-based data-storage facility. In step 1406, the query is executed. Returning to FIG. 13, a data-fetch event is triggered by an attempt to fetch data for analysis or presentation to a user. The get-data handler is shown in FIG. 15. In step 1502, the data warehouse is accessed in order to retrieve the needed data. If the needed data is related to UCC, as determined in step 1504, then the semantic-model-based data-storage facility is accessed, in step 1506, in order to retrieve any relevant UCC that has not yet migrated to the dimensional model database of the data warehouse.

In addition to a semantic model based on RDF, RDF/XML, and SPARQL, other types of semantic-model-based data-storage facilities can be implemented using OWL (Web Ontology Language) ontology model and SPARQL queries. Any of various other types of semantic-model languages and query interfaces may be used in order to implement a UCC semantic-model-based data-storage facility according to the present invention.

Embodiments of the present invention greatly facilitate dashboard-application development. A dashboard application can associate context with UCC automatically, and store the context-associated UCC in a semantic-model-based data-storage facility, rather than requiring users to provide additional annotation to describe the context of comments and other UCC. Additional types of information stored in additional semantic-model-based data-storage facilities may be combined with the UCC semantic-model-based data-storage facility to provide enhanced, aggregated-information facilities.

Although the present invention has been described in terms of particular embodiments, it is not intended that the invention be limited to these embodiments. Modifications will be apparent to those skilled in the art. For example, as discussed above, the UCC semantic-model-based data-storage facility can be implemented in many different ways, using many different semantic-model languages and query interfaces and by varying the many different programming and implementation parameters, including modular organization, control structures, data structures, and other such implementation parameters. The UCC semantic-model-based data-storage facility may be distributed among user computers, may reside in a separate computational environment, or may be included as a component of a data warehouse. The UCC semantic-model-based data-storage facility can be accessed separately from the dimension-model database within a data warehouse, and the UCC semantic-model-based data-storage facility can be easily and rapidly updated, so that UCC is available in real time or near-real time to all users of one or more dashboard or other business-intelligence applications within a distributed, data-warehouse-based business-intelligence or other business-application system.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A data-warehouse-based computational system comprising computers that support interactive creation and exchange of content, the data-warehouse-based computational system further comprising:
   a data warehouse configured to store data according to a dimensional model and that is accessible by users and application programs, the data warehouse configured to store the data in a dimensional-model-based data-storage facility to which data is added by extract-transform-and-load operations at predetermined intervals; and
   a semantic-model-based data-storage facility configured to store user-created content for access by application programs and users, wherein the user-created content is according to a semantic model different from the dimensional model, and wherein the semantic-model-based data-storage facility is configured to store the user-created content, as the user-created content is created, within a time frame that is less than a time between successive ones of the extract-transform-and-load operations; and
   a mechanism to migrate the user-created content from the semantic-model-based data-storage facility to the dimensional-model-based data-storage facility.

2. The data-warehouse-based computational system of claim 1 further including a semantic adapter configured to transform the user-created content, input by a user to an application program, into a semantic-model query for inserting the user-created content into the semantic-model-based data-storage facility.

3. The data-warehouse-based computational system of claim 2 wherein the semantic-model query is used to generate an encoding of a semantic-model subgraph that is transmitted to the semantic-model-based data-storage facility.

4. The data-warehouse-based computational system of claim 2 wherein the semantic-model query is transmitted to the semantic-model-based data-storage facility for execution by the semantic-model-based data-storage facility.

5. The data-warehouse-based computational system of claim 1 wherein the semantic-model-based data-storage facility is a component of the data warehouse.

6. The data-warehouse-based computational system of claim 1 wherein the semantic-model-based data-storage facility is separate from the data warehouse.

7. The data-warehouse-based computational system of claim 1 wherein the semantic-model-based data-storage facility is implemented in a distributed fashion across the computers.

8. The data-warehouse-based computational system of claim 1 wherein the semantic-model-based data-storage facility is implemented as an RDF model against which SPARQL queries are executed.

9. The data-warehouse-based computational system of claim 1 wherein the semantic-model-based data-storage facility is implemented as an OWL model against which SPARQL queries are executed.

10. The data-warehouse-based computational system of claim 1, wherein the semantic-model-based data-storage facility is configured to store the user-created content on a real-time or near-real-time basis as the user-created content is created using an interactive application.

11. The data-warehouse-based computational system of claim 1, wherein the semantic model models relationships among entities represented by the user-created content using nodes and edges connecting nodes.

12. A data-warehouse-based computational system that supports on-demand dimensional-model-based storage-facility update by application programs, the data-warehouse-based computational system comprising:
a data warehouse that stores data in, and that provides data to the application programs from, a dimensional-model-based data-storage facility to which data is added by periodic extract-transform-and-load operations; and
a semantic-model-based data-storage facility in which user-created content is stored for rapid access by application programs and users and from which user-created content migrates to the dimensional-model-based data-storage facility, wherein the semantic-model-based data-storage facility is implemented as an RDF model against which SPARQL queries are executed.

13. The data-warehouse-based computational system of claim 12 further including a semantic adapter configured to transform user-created content, input by a user to an application program, into a semantic-model query for inserting the user-created content into the semantic-model-based data-storage facility.

14. The data-warehouse-based computational system of claim 13 wherein the semantic-model query is used to generate an encoding of a semantic-model subgraph that is transmitted to the semantic-model-based data-storage facility.

15. The data-warehouse-based computational system of claim 13 wherein the semantic-model query is transmitted to the semantic-model-based data-storage facility for execution by the semantic-model-based data-storage facility.

16. The data-warehouse-based computational system of claim 12 wherein the semantic-model-based data-storage facility is a component of the data warehouse.

17. The data-warehouse-based computational system of claim 12 wherein the semantic-model-based data-storage facility is separate from the data warehouse.

18. The data-warehouse-based computational system of claim 12 wherein the semantic-model-based data-storage facility is implemented in a distributed fashion across two or more user computers.

19. A method for providing for interactive creation of user content and real-time or near-real-time exchange of user-created content in a data-warehouse-based computational system, the method comprising:
providing a data warehouse that stores data according to a dimensional model, for access by users and application programs, in a dimensional-model-based data-storage facility to which data is added by extract-transform-and-load operations at predetermined intervals;
providing a semantic-model-based data-storage facility in which the user-created content is stored according to a semantic model different from the dimensional model, wherein the user-created content in the semantic-model-based data-storage facility is accessible by application programs and users, wherein the user-created content is stored in the semantic-model-based data-storage facility, as the user-created content is created, within a time frame that is less than a time between successive ones of the extract-transform-and-load operations, and wherein the user-created content is migrated to the dimensional-model-based data-storage facility; and
upon input of the user-created content to an application program, transforming the user-created content into a semantic-model query for adding the user-created content to the semantic-model-based data-storage facility.

20. The method of claim 19, wherein the semantic-model-based data-storage facility stores the user-created content on a real-time or near-real-time basis as the user-created content is created using an interactive application.

21. The method of claim 19, wherein the semantic model is an RDF model or an OWL model.

* * * * *